United States Patent
Guercio Faísca et al.

(10) Patent No.: US 11,852,268 B2
(45) Date of Patent: Dec. 26, 2023

(54) FLANGE CONNECTION SET

(71) Applicant: FMC TECHNOLOGIES DO BRASIL LTDA, Rio de Janeiro (BR)

(72) Inventors: André Guercio Faísca, Rio de Janeiro (BR); Guilherme Sousa Moura, Rio de Janeiro (BR); Huei Sun Lai, Rio de Janeiro (BR); Ivar Hordnes, Oslo (NO); Leonardo de Araujo Bernardo, Rio de Janeiro (BR); Nigel Mckie, Conroe, TX (US); Renato Saioron Bernardo, Cruzeiro (BR)

(73) Assignee: FMC TECHNOLOGIES DO BRASIL LTDA, Rio de Janeiro (BR)

( * ) Notice: Subject to any disclaimer, the term of this patent is extended or adjusted under 35 U.S.C. 154(b) by 527 days.

(21) Appl. No.: 17/054,727

(22) PCT Filed: May 9, 2019

(86) PCT No.: PCT/BR2019/050171
§ 371 (c)(1),
(2) Date: Nov. 11, 2020

(87) PCT Pub. No.: WO2019/213728
PCT Pub. Date: Nov. 14, 2019

(65) Prior Publication Data
US 2021/0239246 A1    Aug. 5, 2021

(30) Foreign Application Priority Data
May 11, 2018 (BR) .......................... 102018009670-2

(51) Int. Cl.
*F16L 23/18* (2006.01)
*F16L 23/032* (2006.01)
(Continued)

(52) U.S. Cl.
CPC ............ *F16L 23/18* (2013.01); *F16L 23/032* (2013.01); *F16L 23/20* (2013.01); *F16L 23/22* (2013.01); *G01M 3/02* (2013.01)

(58) Field of Classification Search
CPC ......... F16L 23/18; F16L 23/032; F16L 23/20; F16L 23/22; G01M 3/02
See application file for complete search history.

(56) References Cited

U.S. PATENT DOCUMENTS

| 5,431,417 A | 7/1995 | Dahlgren |
| 6,561,521 B2 | 5/2003 | Janoff et al. |

(Continued)

FOREIGN PATENT DOCUMENTS

EP    2828560 B1    3/2017

OTHER PUBLICATIONS

International Search Report issued in corresponding International Application No. PCT/BR2019/050171; dated Jul. 22, 2019 (3 pages).

(Continued)

*Primary Examiner* — Kristina M Deherrera
*Assistant Examiner* — Jean F Morello
(74) *Attorney, Agent, or Firm* — Osha Bergman Watanabe & Burton LLP (57) ABSTRACT

A flange connection set includes a modified compact flange, having a channel for external-internal seal tests, coupled to a connecting component, and coupled between the compact flange and the connecting component, there is a KX sealing ring with a radius closer to the radius of the conduit. Different types of keys provide the flange connection the ability to withstand high shear and torsional loads without affecting its operation, while also resisting high bending moment loads and preserving the integrity of the sealing ring and the fasteners.

13 Claims, 7 Drawing Sheets

(51) Int. Cl.
*F16L 23/20* (2006.01)
*G01M 3/02* (2006.01)
*F16L 23/22* (2006.01)

(56) References Cited

U.S. PATENT DOCUMENTS

| | | | |
|---|---|---|---|
| 7,523,644 B2 * | 4/2009 | Van Winkle | F16L 23/167 |
| | | | 73/49.3 |
| 9,726,313 B2 | 8/2017 | Haringstad | |
| 2005/0242519 A1 | 11/2005 | Koleilat et al. | |
| 2015/0108723 A1 * | 4/2015 | Bekkevold | E21B 33/1212 |
| | | | 277/609 |

OTHER PUBLICATIONS

Written Opinion of the International Searching Authority issued in corresponding International Application No. PCT/BR2019/050171; dated Jul. 22, 2019 (3 pages).

* cited by examiner

FLANGE CONNECTION SET

FIELD OF THE INVENTION

The present invention relates to a flange connection set which comprises a modified compact flange, having a channel for external-internal seal tests, coupled to a connecting component, said set further comprising a KX sealing ring positioned between the modified compact flange and the connecting component. The present invention also reveals the introduction of possible types of keys which confer on the flange connection the ability to withstand high shear and torsional loads without affecting its operation, thus preserving the integrity of the sealing ring and fasteners. The flange connection set, object of the present invention, can be used in any mechanical system wherein piping connections are required.

BACKGROUND OF THE INVENTION

Flange connections with fasteners are widely used to tightly connect fluid conduits due to their characteristics of being easily removable and generally showing good resistance to cyclical loads.

The sealing is made by metal or polymer rings positioned at the connection interface. These metal or polymer rings are initially energized in the gasket assembly creating a contact pressure between the faces of the seal and the components being connected, in such a way that the microchannels created by the roughness of both faces in contact are practically eliminated. Thus, the yield strength in the radial direction at the gasket interface becomes so high that any yield in that direction is negligible.

The connection assembly involves the application of a determined level of preload to the fasteners in order to guarantee the energization of the seal not only in the assembly but also when loads that tend to separate the gasket are applied. In addition, the application of the preload induces a compression of the gasket promoting a parallel combination of the stiffness of the gasket and the bolts in the tensile load strength. Normally, the gasket is designed to have a stiffness much higher than that of the bolts so that the load variation therein is small, thus reducing the susceptibility to failures due to material fatigue.

In the subsea oil and gas exploration industry, this type of connection is normally used in highly corrosive environments, with high thermal amplitudes and subject to high (both internal and external) pressure gradients and high external loads.

There are many types of flanges being currently used in this industry, but certainly some of the best known and most used are those that meet API-6A standard. These flanges have metal seals inserted in axisymmetric channels provided on both sides of the connection. Such channels are arranged in a protrusion located at the interface which has an external diameter smaller than that of the drilling circle. This guarantees high contact pressure values between the surfaces of the channels and the seal, preventing the gasket region directly below the fasteners from being supported by the opposite face of the connection.

It causes an unsupported tab bending and, with the rotation of the gasket-fastener interface, they are also bent. The introduction of additional stresses due to the bending of the fasteners forces these flange concepts to use greater fastener nominal and, therefore, ends up increasing the envelope, weight and cost of the connection.

Some designs of the flange connections, such as those disclosed in the Norwegian standard NORSOK L-005 and commonly known as "SPO Compact Flanges" from Vector InternationalLtd™ company, South Glamorgan, Great Britain, are able to minimize this bending effect induced in the fasteners without affecting the high distribution of contact pressure required in the vicinity of the seal. This type of gasket has a conical contact with a small angle (with orientation always guaranteeing an initial contact in radius close to that of the conduits), and the gasket-fastener interface is also conical with the same angle. Therefore, as the preload is applied to the fasteners, the flange tab is slightly bent, and the external radius of the contact ring increases.

At the end of the application, the assembly guarantees contact throughout the gasket interface and, therefore, there is no rotation of the interface with the fasteners.

Thus, this connection concept allows, for the same level of loading, the use of smaller fastener nominal and thinner tabs leading to a reduction in cost, envelope and weight of the gasket. For this reason, this concept of flange connection is commonly known as "Compact Flange".

Flange connections of small conical contact angle solve the problem of flanges having rings with flat contact and radius smaller than the drilling circle. However, solutions existing on the market still have shortcomings.

Figure 1:
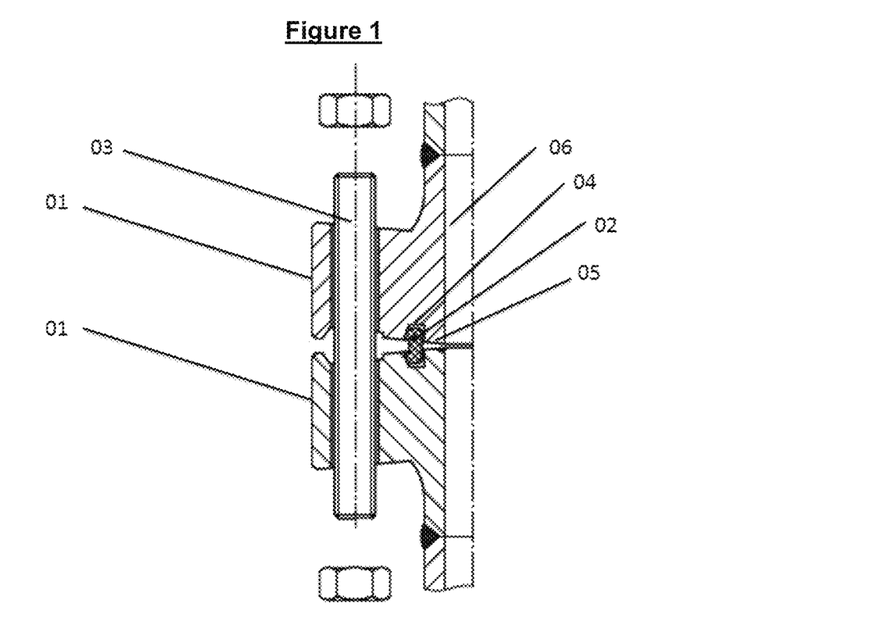
FIG. 1—Cross section of a state-of-the-art flange connection.

The conical contact flanges available in the state of the art have seals with sealing radii considerably larger than the radius of the conduits, as can be seen in FIG. 1. This allows the fluid pressure to act over a larger area, thus creating higher separation forces in the gasket. For applications involving high internal pressures, such as those in the offshore industry, this increased separation effect requires preload specification and, consequently, greater fastener nominals.

Furthermore, the available conical contact flanges do not present any solution for applications with high shear and torsional loads, where the flange connection tends to rotate in relation to the connecting component, due to efforts caused by expansion, fluid flow or even during installation, in addition to the loads resulting from the weight of the lines during operation.

The available flanges rely only on the friction between the surfaces in contact to resist these loads, since this capacity is exceeded, both the seal and the fasteners can be jeopardized. The frictional strength capacity of the gasket, in addition to being highly uncertain, is normally low, which prevents these flanges from being used in applications with high shear or torsional loads.

BRIEF DESCRIPTION OF THE INVENTION

The present invention provides improvements over the existing flange connections, since it uses a KX metal or polymer sealing ring or similar between the faces of the connecting elements having a sealing radius closer to that of the conduits, thus minimizing the separation force of the flange components due to the internal pressure.

In addition, the compact flange of the present invention has a channel crossing the flange from its external area to its internal area, and serves to perform seal tests of the metal-to-metal sealing regions of the ring with the flange and with the connecting component.

The present invention further discloses the introduction of possible types of keys which confer on the flange connection the ability to withstand high shear and torsional loads without affecting its operation, thus preserving the integrity of the sealing ring and fasteners.

BRIEF DESCRIPTION OF THE FIGURES

The present invention will be described with the accompanying drawings, which serve only to illustrate an embodiment of the invention, without thereby implying limitations or restrictions in its scope. Hence.

Although the subject matter revealed herein is susceptible to several modifications and alternative forms, its specific embodiments will be brought forth as an example in the drawings and are described in detail here. It should be understood, however, that the description of the specific embodiments illustrated herein is not intended to limit the invention to the particular forms disclosed, but rather the intention is to encompass all modifications, equivalents and alternatives that are within the spirit and scope of the invention, as defined by the appended claims.

DETAILED DESCRIPTION OF THE INVENTION

As can be seen from the figures appended, the present invention relates to a flange connection set (100) comprising a modified compact flange (07) coupled by fasteners (31) to a connecting component (17), wherein, between the modified compact flange (07) and the connecting component (17), a KX sealing ring (11) is used.

The modified compact flange (07) comprises a tab (12) comprising a truncated conical-shaped contact face (20a) having an angulation in the range of 0.05 to 0.9 degrees with the contact face (20b) of the connecting component (17). The modified compact flange (07) also has a front contact face (30a), parallel to the contact face (20a), which also has a truncated conical shape and the same angulation as the contact face (20a), in the range of 0.05 to 0.9 degrees. Also, the modified compact flange (07) has an internal contact face (65a), with a truncated conical profile, forming an obtuse angle with the contact face (20a) and an obtuse angle with the surface (68a), which, in turn, is parallel to the contact face (20b) of the connecting element (17). The contact face (68a) is bounded on one side by the contact face (65a) and, on the other side, by the internal radius (22) of the conduit tube (33). Said contact face (65a) has a protrusion (66) at its lower end across the entire perimeter of the contact face (65a), which serves to fix the sealing ring (11) to the modified compact flange (07), in order for the axial movement of these coupled components to be performed, so that, during assembly, the sealing ring (11) is kept in the correct position and does not fall, allowing the assembly in the modified compact flange (07) in any position, without falling. Also, the modified compact flange (07) comprises in its tab (12) symmetrically arranged holes (39a) in which the fasteners (31) are inserted, the number of holes and fasteners varying according to the project nominal and loads. The modified compact flange (07) also has a channel (13) with a diameter of approximately 3 mm (0.12 in) crossing the flange, in which the channel (13) will be aligned with the seal test chamber formed by the sealing regions (18), (19) and the seal (14b) of the sealing ring (11) after coupling. The modified compact flange (07) has, in one or more embodiments of flange connection set (100), at least one pair of keyways (35a) diametrically opposite anywhere on the contact face (20a) between the external radius and the internal radius of the said contact face (20a). The modified compact flange (07), in another embodiment of the flange connection set (100), comprises at least one tubular keyway (40a) located surrounding at least one hole (39a) in which the fasteners (31) will be inserted. The modified compact flange (07), in another embodiment of the flange connection set (100), comprises at least one keyway (42a) at the external radius of the contact face (20a).

The sealing ring (11) of the present invention is a KX sealing ring having a groove (14a) and, parallelly, a groove (16a) in its central region surrounding the perimeter of the sealing ring (11), said sealing ring (11) further provided with an elastomeric seal (14b) positioned in the groove (14a) and an elastomeric ring (16b) positioned in the groove (16a). The sealing ring (11) further has a recess (34) on its face, transversal and perpendicular to the grooves (14a) and (16a), said recess (34) allows the connection between the sealing regions (18) and (19), thus making it possible, from the pressurization of the chamber through the channel (13) of the modified compact flange (07), to carry out seal tests of the two sealing regions (18) and (19) and the seal (14b) of the sealing ring (11). The sealing ring (11) also has a contact face (65c) with a truncated conical profile and a contact face (65d) with a truncated conical profile on its external surface across its perimeter.

The connecting component (17) may be another compact flange of the present invention, a block, a valve body or other mechanical component to which the modified compact flange (07) of the present invention can be coupled. It shall have an internal contact face (65b) with a truncated conical profile, forming an obtuse angle with the contact face (20b) and an obtuse angle with the surface (68b), which, in turn, is parallel to the contact face (20b) of the connecting element (17). The contact face (68a) is bounded on one side by the contact face (65b) and, on the other side, by the internal radius (22) of the conduit tube (33). The connecting component (17) further has, on its contact face, (20b) symmetrically arranged holes (39b) for fixing fasteners (31), and in one or more embodiments of the flange connection set (100), it has at least one pair of keyways (35b) diametrically opposite anywhere on the contact face (20b) of the connecting component (17) between the external radius and the internal radius, so that when the modified compact flange (07) is coupled to the connecting component (17), the keyways (35a) are aligned with the respective keyways (35b). The connecting component (17), in another embodiment of the flange connection set (100), comprises at least one tubular keyway (40b) located surrounding the at least one hole (39b) in which the fasteners (31) will be inserted. The connecting component (17) in another embodiment of the flange connection set (100) comprises at least one keyway (42b) at the external radius of the contact face (20b).

The assembly of the flange connection set (100) of the present invention comprises coupling the metal sealing ring (11) to the modified compact flange (07), so that, when the coupling is performed, the elastomeric ring (16b) has resistance to pass through the protrusion (66), undergoing deformation while crossing, and returning to its original shape after the passage, so that the sealing ring (11) is fixed to the modified compact flange (07), contacting its contact face (65c) with the contact face (65a). After coupling the metal sealing ring (11) to the modified compact flange (07), said modified compact flange (07) is coupled to the connecting component (17) by fasteners (31), so that the contact face (65b) of the connecting component (17) contacts the contact face (65d) of the sealing ring (11) and so that the contact face (20a) of the modified compact flange (07) contacts the contact face (20b) of the connecting component (17), for the first elastomeric seal (14b) to interface the ends of the contact face (20a) of the modified compact flange (07) and the contact face (20b) of the connecting component (17). By tightening the fasteners (31), the sealing ring (11) is energized, creating two circular metal-to-metal sealing regions (18) and (19), where the first metal-to-metal sealing region (18) comprises the contact between the contact face (65a) of the modified compact flange (07) and the contact face (65c) of the sealing ring (11) and the second metal-to-metal sealing region (19) comprises the contact between the contact face (65b) of the connecting component (17) and the contact face (65d) of the sealing ring (11). Also, when the fasteners (31) are tightened, a seal test chamber is created, interconnecting the channel (13) with the metal-to-metal sealing regions (18) and (19) and with the elastomeric seal (14b), said seal test chamber is used for making a seal test in an internal-external direction of the metal-to-metal sealing regions (18), (19) and the seal (14b). Said elastomeric seal (14b), in addition to the sealing function for carrying out the seal test of the seal test chamber, it also functions as a second leak barrier. Also, when the fasteners (31) are tightened, the contact face (20a) of the tab (12) of the modified compact flange (07) bends and comes into full contact with the contact face (20b) of the connecting component (17). so that the two contact faces (20a) and (20b) now have the same angulation.

The fact that the flange connection set (100) presents the radius of the sealing ring (11) closer to that of the conduit tube (22) is for the separation forces of the flanged components due to the internal pressure to be minimized.

The seal test is carried out by pressurizing the seal test chamber formed by the metal-to-metal sealing regions (18) and (19) and the seal (14b), by means of the injection of a hydraulic fluid or gas through the channel (13) and then checking whether the pressure has decreased after a certain time, as defined in the standard.

In another embodiment, the modified compact flange (07), from the inside, is provided with a small flat circular face (67) facing the truncated conical contact face (20a) just to facilitate the components machining.

In another embodiment of the present invention, at least one pair of keys (36) is introduced between the coupling of the modified compact flange (07) to the connecting element (17), the keys (36) being of any shape, with or without gaps.

In another embodiment of the present invention, at least one tubular key (41) is inserted in the tubular keyways (40a) and (40b) between the coupling of the modified compact flange (07) to the connecting element (17).

In another embodiment of the present invention, at least one key (42) is introduced in the tubular keyways (42a) and (42b) in the external radius of both the modified compact flange (07) and the connecting component (17), the key (42) being of any shape, with or without gaps.

The purpose of the introduction of the keys mentioned above is for the torsional stress to introduce little or no load in the sealing ring and fasteners, thus preserving the integrity of the sealing ring and fasteners, reducing the risk of damage to these components and also guaranteeing an increase in the capacity of the flange connection set (100) to withstand high shear and torsional stresses, while also resisting high bending moment loads.

With reference to FIG. 1, there is illustrated a sectional view of one compact flange (01) of the state of the art connected to another compact flange of the state of the art (01), wherein one seal IX (02) is positioned in a coupling recess (04) at a distance (05) from the conduit tube (06). Fasteners (03) are used to join the flanges (01) and energize the seal (02). The distance (05) between the conduit (06) and the seal (02) causes an increase in the separation stresses while fluid is passing through.

Figure 2:
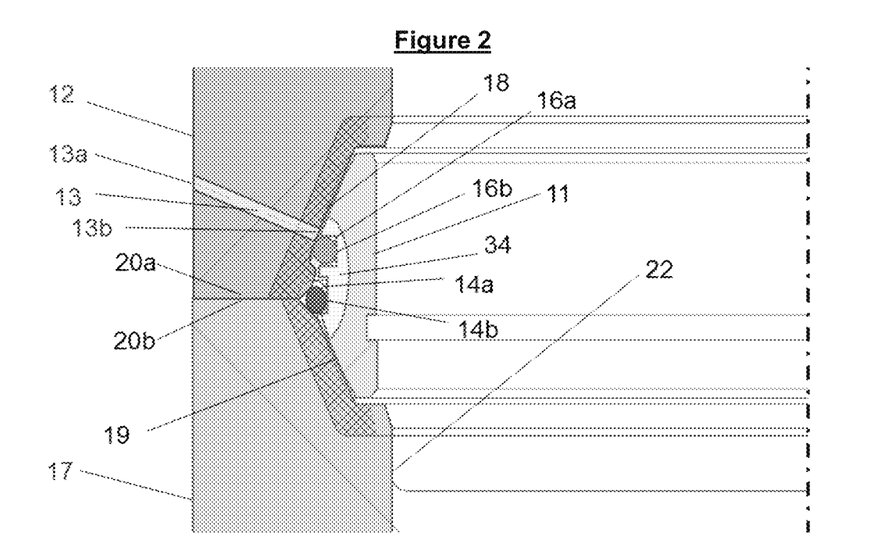
FIGS. 2 and 2a—Cross section of the flange connection set of the present invention illustrating the channel, the metal-to-metal sealing regions and the contact faces of the components.
Figure 2A:
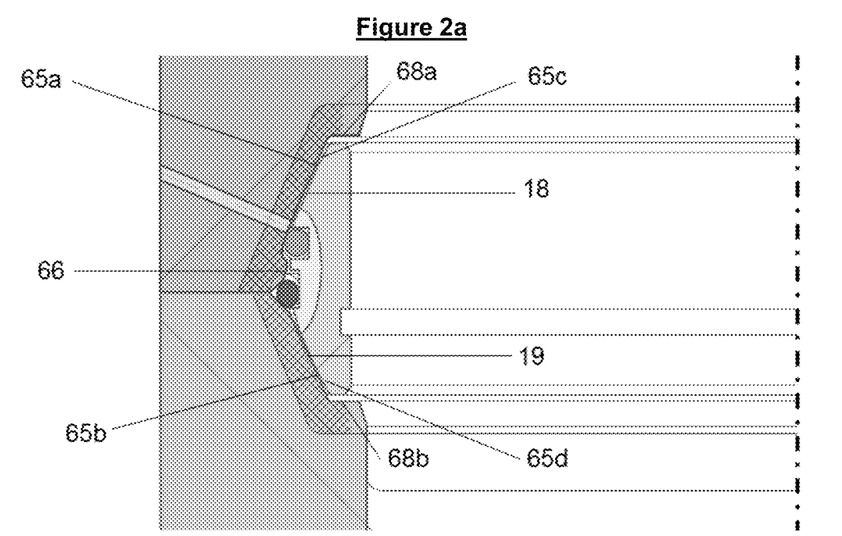

With reference to FIGS. 2 and 2a, the same illustrate a cross section of the flange connection set (100) with the fasteners (31) tightened, wherein it is illustrated the contact face (20a) of the modified compact flange in full contact with the contact face (20b) of the connecting element (17); it further illustrates the channel (13) crossing the modified compact flange (07). A metal sealing ring (11), having an internal radius closer to the internal radius (22) of the conduit pipe (33), is positioned between the modified compact flange (07) and the connecting component (17) and it is then energized by tightening the fasteners (31), creating two metal-to-metal sealing regions (18) and (19). The sealing ring also has a first groove (14a) and a second groove (16a) in its central region surrounding the perimeter of the ring (11), wherein a first elastomeric seal (14b) is positioned in the first groove (14a) and a second elastomeric seal (16b) is positioned in the second groove (16a). FIG. 2 also illustrates the recess (34) connecting the metal-to-metal sealing regions (18) and (19), thereby forming the seal test chamber. FIG. 2a further illustrates the first metal-to-metal sealing region (18) comprising the contact between the contact face (65a) of the modified compact flange (07) and the contact face (65c) of the sealing ring (11). FIG. 2a further illustrates the second metal-to-metal sealing region (19) comprising the contact between the contact face (65b) of the connecting component (17) and the contact face (65d) of the sealing ring (11).

Figure 3:
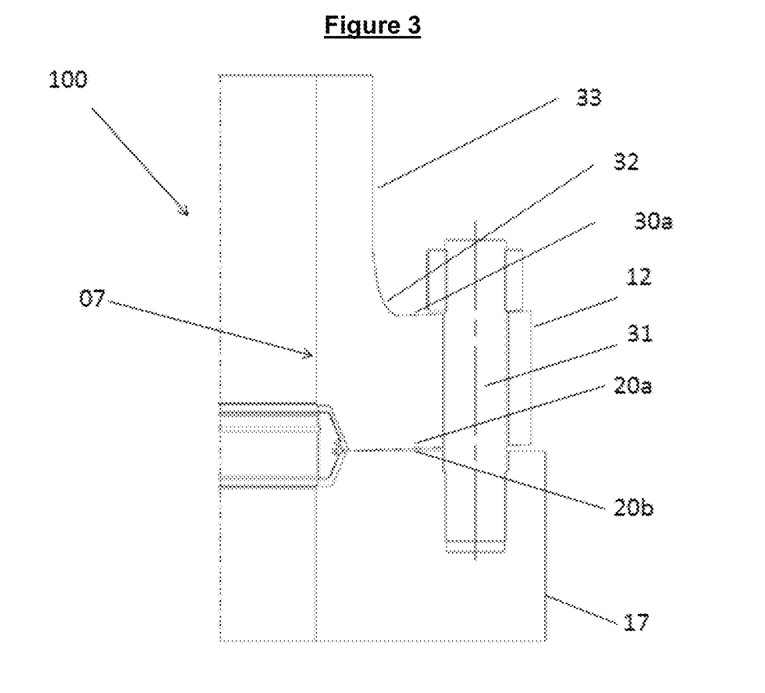
FIG. 3—Cross section of the flange connection set of the present invention, illustrating the connection of the flange to the connecting component without the fasteners being tightened.

With reference to FIG. 3, it illustrates a part of the flange connection set (100) in which the modified compact flange (07) is coupled to the connecting component (17) without the fasteners (31) being tightened, so that the tab (12) of the modified compact flange (07) can be observed without being bent, thus demonstrating that the contact face (20*a*) has a truncated conical shape with an angulation that can vary in the range of 0.05 to 0.9 degrees (in the illustration an exaggerated angulation was used only to improve visualization and understanding) in relation to the contact face (20*b*). FIG. 3 also illustrates an front contact face (30*a*) which also has a truncated conical shape and shall have the same angulation as the contact face (20*a*), so that after tightening the fasteners (31), the tab (12) of the modified compact flange (07) bents and both the contact face (20*a*) and the front contact face (30*a*) are parallel to the contact face (20*b*) (having the same angulation), which can be best seen in FIGS. 2 and 7. The transition (32) between the tab (12) of the modified compact flange (07) and the conduit tube (33) is also illustrated in FIG. 3, the transition (32) of which assuming any shape, such as conical, circular, with radius of variable curvature or etc.

Figure 3A:
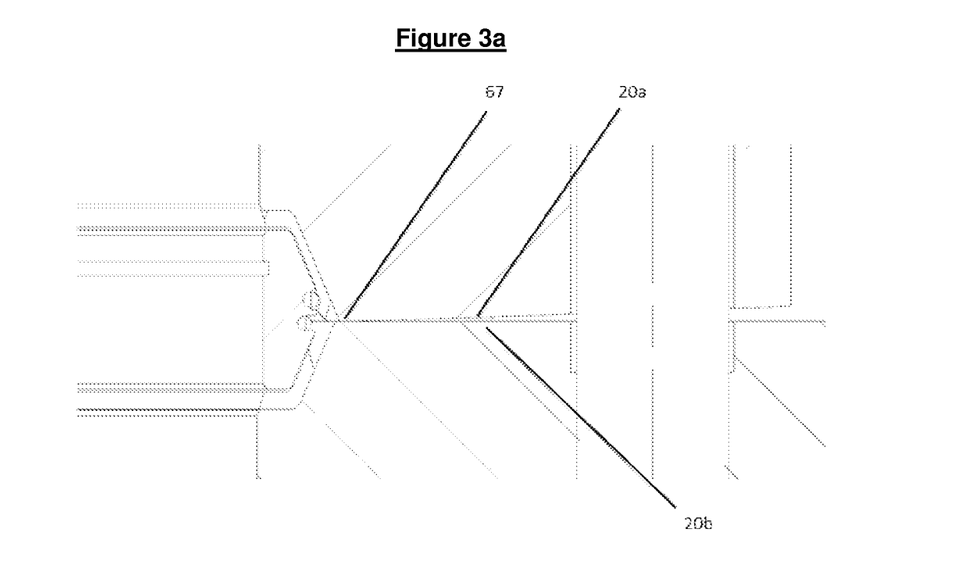
FIG. 3a—Cross section of the flange connection set of the present invention illustrating the small flat contact face.

FIG. 3*a* illustrates a small flat circular face (67) on the modified compact flange (07) between the sealing ring (11) and the truncated conical shaped-contact face (20*a*) just to facilitate the components machining.

Figure 4:
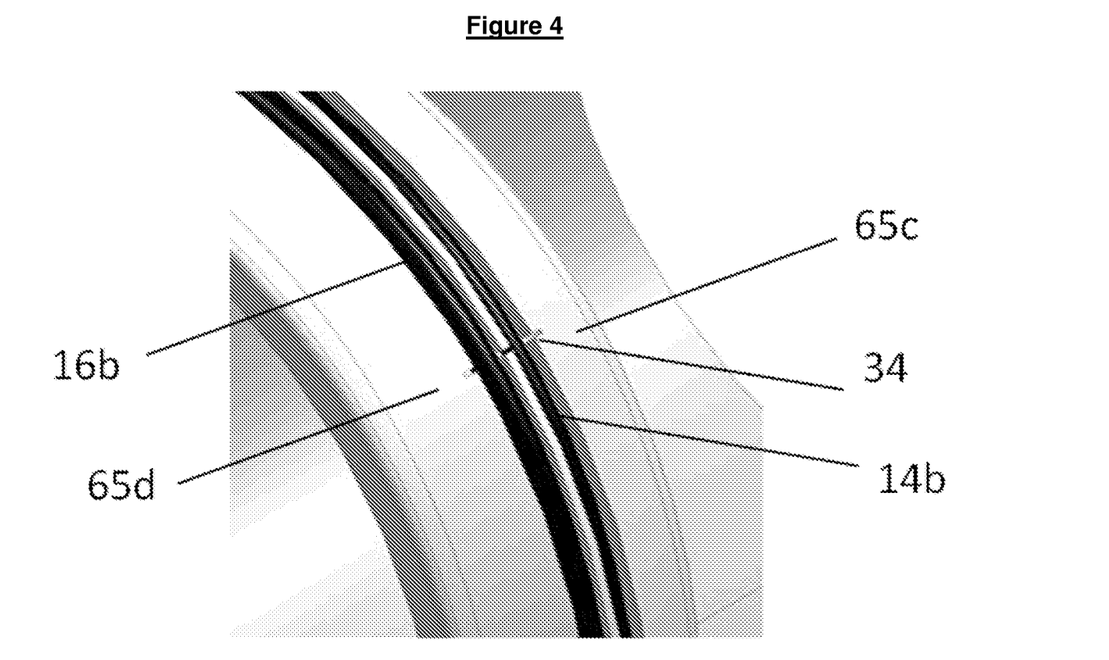
FIG. 4—Perspective view of the KX sealing ring.

With reference to FIG. 4, a perspective view of the sealing ring (11) is illustrated, wherein the recess (34) can be observed, allowing the connection between the two sealing regions (18) and (19) and, therefore, the creation of the seal test chamber.

Figure 5:
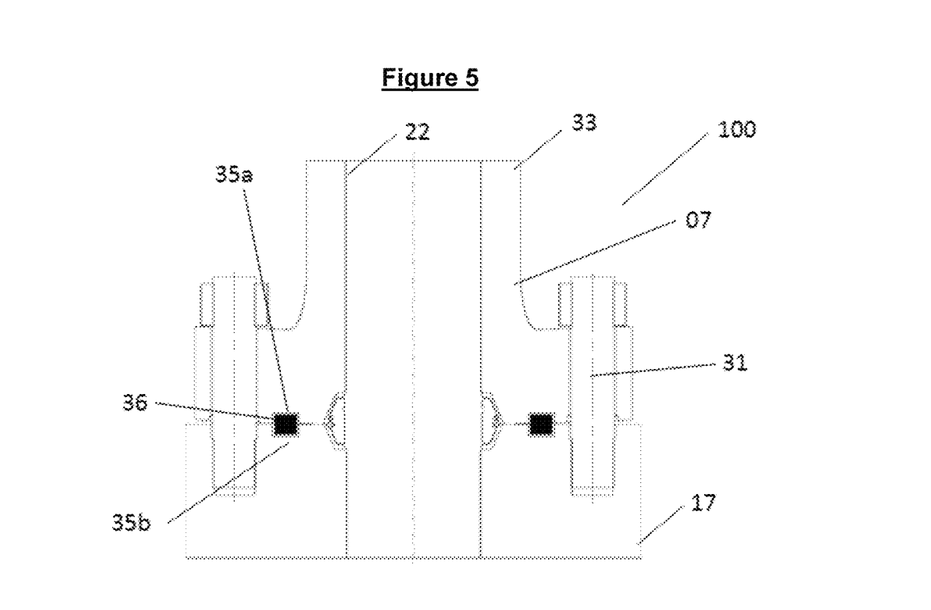
FIG. 5—Cross section of the flange connection set of the present invention illustrating the positioning of the keys in one of the embodiments thereof.

With reference to FIG. 5, an embodiment of the flange connection set (100) is illustrated, in which it comprises at least one pair of keyways (35*a*) diametrically opposite anywhere on the contact face (20*a*) of the modified compact flange (07) between the external radius and the internal radius, a pair of keyways (35*b*) diametrically opposite anywhere on the contact face (20*b*) of the connecting component (17) between the external radius and the internal radius, so that when the modified compact flange (07) is coupled to the connecting component, the recesses (35*a*) are aligned with the respective recesses (35*b*), and the at least two or more keys (36) are arranged in a such a way that they occupy a entire or partial portion of both the keyways (35*a*) and the keyways (35*b*), in order for the keys (36) to prevent a possible relative torsional movement between the modified compact flange (07) and the connecting component (17). The purpose of the introduction of at least a pair of keys (36) in the recesses (35*a*) and (35*b*) is for torsional stresses to introduce little or no load in the sealing ring and fasteners, thus reducing the risk of damage to these components and also guaranteeing an increase in the capacity of the flange connection set (100) to withstand high shear and torsional stresses.

Figure 5A:
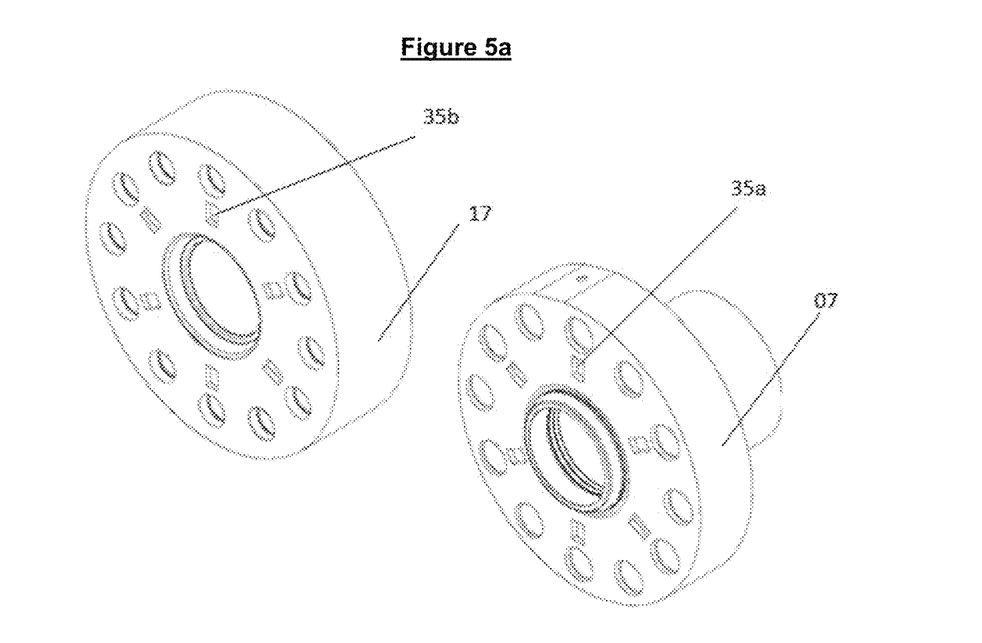
FIG. 5a—Cross section of the flange connection set of the present invention illustrating the positioning of the keys, in one of the embodiments thereof, in the components of the separate flange connection set, arranged side by side.

FIG. 5*a* illustrates the keyways (35*a*) arranged on the contact face (20*a*) of the modified compact flange (07) of the present invention, FIG. 5*a* also illustrates the keyways (35*b*) arranged on the contact face (20*b*) of the connecting component (17).

Figure 6:
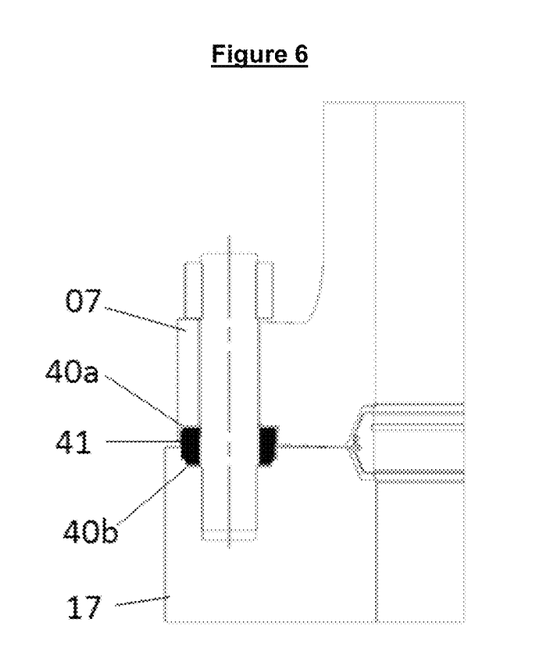
FIG. 6—Cross section of the flange connection set of the present invention illustrating another possibility for positioning the keys.

With reference to FIG. 6, it illustrates a cross section of another embodiment of the flange connection set (100) of the present invention, in which a tubular key (41), with or without gaps, after set assembly, has a lower portion of its body inserted in a tubular keyway (40*b*) located surrounding the fastener hole (39*b*) in the connecting component (17), and an upper portion inserted in a tubular keyway (40*a*) located around the fastener hole (39*a*). The purpose of the introduction of one or more tubular keys (41) is for the torsional stresses to introduce little or no load in the sealing ring and fasteners, thus reducing the risk of damage to these components and also guaranteeing an increase in the capacity of the flange connection set (100) to withstand high shear and torsional stresses.

Figure 7:
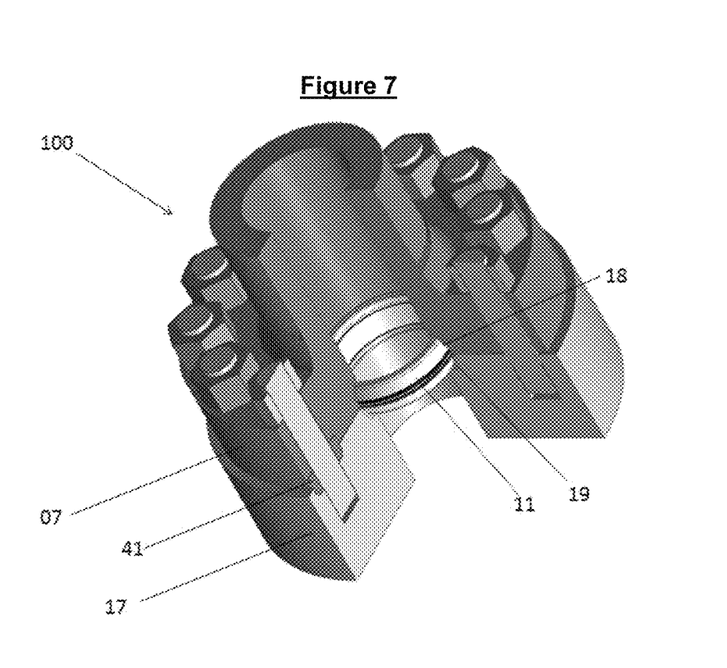
FIG. 7—Partial cut-away, perspective view illustrating the seal and tubular key assembled.

With reference to FIG. 7, it illustrates a perspective section of an embodiment of the flange connection set (100) of the present invention, wherein it is possible to have a better observation of the tubular key (41) being inserted in the assembly between the modified compact flange (07) and the connecting component (17). One can still have a better observation of the coupling of the sealing ring (11) and the metal-to-metal sealing regions (18) and (19).

Figure 8:
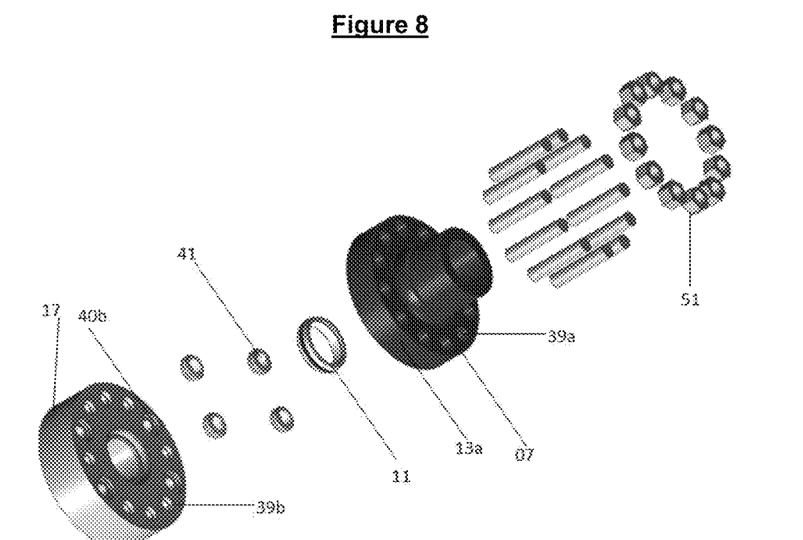
FIG. 8—Exploded perspective view of the flange connection set.
Figure 8A:
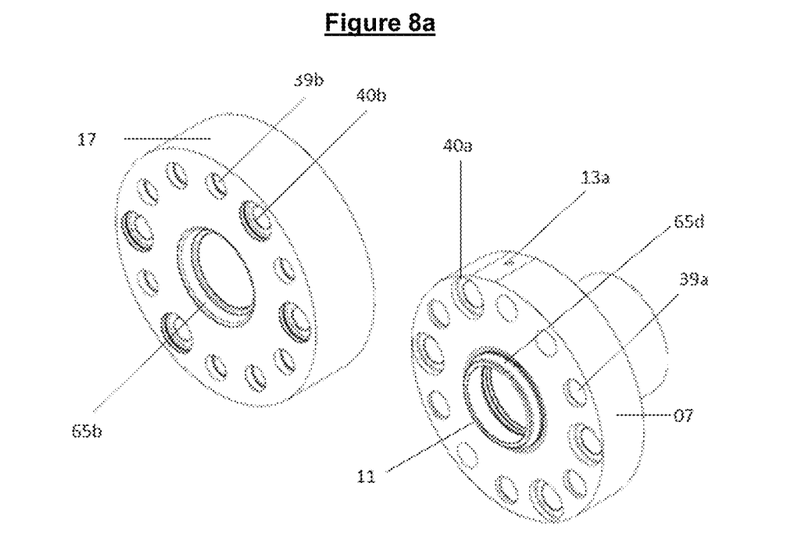
FIG. 8a—Perspective view of the separated elements of the flange connection set, arranged side by side, illustrating the tubular keyways.

FIGS. 8 and 8*a* illustrate a perspective view of an embodiment of the flange connection set (100) of the present invention, wherein it is possible to have a better observation of the connecting component (17) comprising the tubular keyways (40*b*) and the fastener holes (39*b*), the tubular keys (41), the sealing ring (11). Furthermore, it can also be observed the modified compact flange (07) comprising the keyways (40*a*), the fastener holes (39*a*), the external hole (13*a*) of the channel (13) having a flattened surface, just to facilitate the machining of the hole of the channel (13). Finally, the fasteners (31) and their nuts (51) are illustrated.

Figure 9:
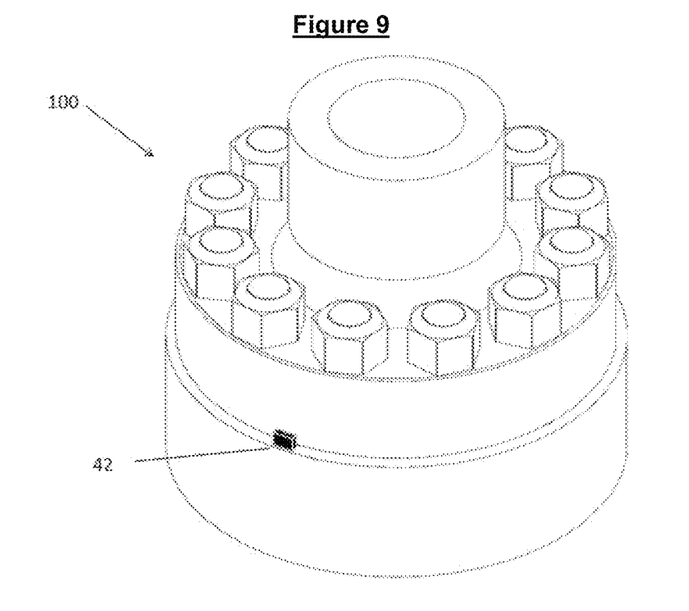
FIG. 9—Perspective view of the flange connection set illustrating the use of keys at its external radius.
Figure 9A:
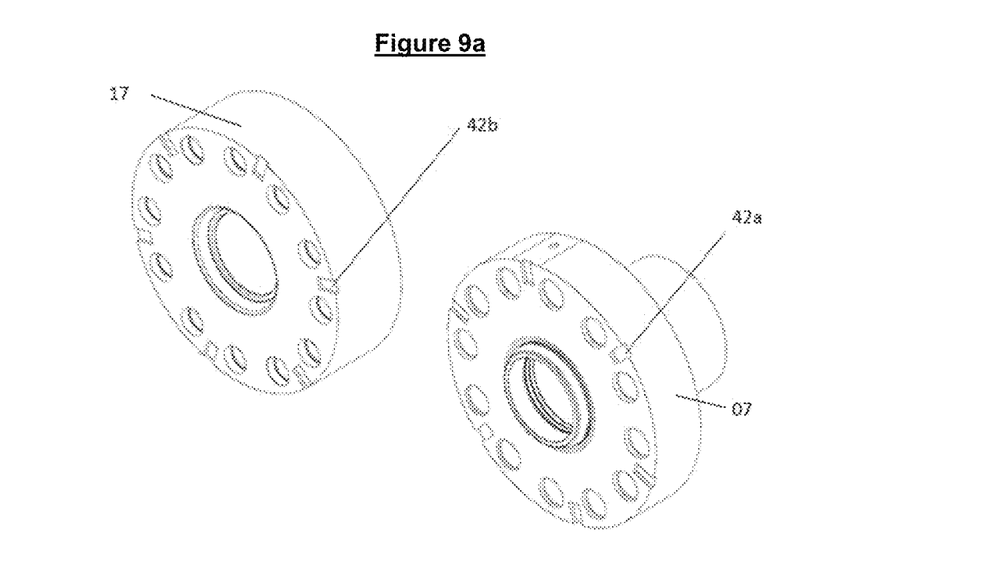
FIG. 9a—Perspective view of the separated flange connection set elements, arranged side by side, illustrating the keyways at their external radii.

With reference to FIGS. 9 and 9*a*, the same illustrate an embodiment of the flange connection set (100) of the present invention, in which one key (42) of any shape, with or without gaps, is inserted in the keyways (42*a*) and (42*b*), respectively, in the modified compact flange (07) and the connecting component (17) in its external radius, so that, after the coupling of the modified compact flange (07) to the connecting component (17), the torsional stresses introduce little or no load in the sealing ring and fasteners, thus reducing the risk of damage to these components and also guaranteeing an increase in the capacity of the flange connection set (100) to withstand high shear and torsional stresses.

Although the invention has been described in relation to a limited number of embodiments, those skilled in the art, having the benefit of this disclosure, will appreciate that other embodiments that do not depart from the scope of the invention as herein disclosed can be devised. Therefore, the scope of the invention should be limited only by the appended claims.

The invention claimed is:

1. A flange connection set comprising: a modified compact flange comprising a tab, said tab comprising a truncated conical shaped-contact face having an angulation in a range of 0.05 to 0.9 degrees with a first contact face of the connecting component; a front contact face, parallel to the contact face of the tab, which also has a truncated conical shape and the same angulation as the contact face of the tab, in the range of 0.05 to 0.9 degrees; an internal contact face, with a truncated conical profile, forming an obtuse angle with the contact face of the tab and an obtuse angle with a surface parallel to the first contact face of the connecting component; a second contact face of the tab bounded on one side by the internal contact face of the tab and, on the other side, by an internal radius of a conduit tube; a protrusion across an entire perimeter of a lower end of the internal contact face of the tab; holes, arranged symmetrically in the tab, for fasteners to be inserted; a channel with a diameter of 3 mm, which crosses the modified compact flange;

a KX sealing ring, having a first groove and, parallel, a second groove in its central region surrounding a perimeter of the sealing ring, an elastomeric seal positioned in the groove and an elastomeric ring positioned in the groove; a recess on a face of the sealing ring, transverse to the first and second grooves and; a first contact face with a truncated conical profile and a second contact face with a truncated conical profile on an external surface across the perimeter of the sealing ring;

the connecting component comprising an internal contact face with a truncated conical profile, forming an obtuse angle with the first contact face of the connecting component and an obtuse angle with the surface which, in turn, is parallel to the contact face of the connecting component; a second contact face bounded on one side by the internal contact face of the connecting component and, on the other side, by the internal radius of the conduit tube; the connecting component further having holes on its first contact face, arranged symmetrically on the first contact face, for fixing fasteners;

wherein the flange connection set comprises coupling the sealing ring to the modified compact flange and coupling the modified compact flange to the connecting component by fasteners, wherein the internal contact face of the tab of the modified compact flange comes into contact with the first contact face of the sealing ring, providing a first metal-to-metal sealing region, the internal contact face of the connecting component comes into contact with the second contact face of the sealing ring, providing a second metal-to-metal circular sealing region and the tab of the modified compact flange bends, causing the first contact face of the tab to come into full contact with the first contact face of the connecting component, arranging the two faces at the same angulation and the first elastomeric seal interfacing with the ends of the first contact face of the tab of the modified compact flange and the first contact face of the connecting component.

2. The flange connection set according to claim 1, further comprising a seal test chamber formed between two sealing regions (19) and the elastomeric seal of the sealing ring, where the connection between the two sealing regions occurs through the recess of the sealing ring, wherein, after the coupling of the modified compact flange to the connecting component, the channel will be aligned with said seal test chamber.

3. The flange connection set according to claim 2, wherein the channel is aligned with said chamber.

4. The flange connection set according to claim 1, wherein a radius of the sealing ring is approximately equal to the radius of the conduit pipe.

5. The flange connection set according to claim 1, wherein the modified compact flange comprises a first pair of keyways diametrically opposite anywhere on the first contact face of the tab between an external radius and an internal radius of said first contact face of the tab, and the connecting component comprises a second pair of keyways diametrically opposite anywhere on the first contact face of the connecting component between an external radius and an internal radius of the first contact face of the connecting component.

6. The flange connection set according to claim 5, further comprising a first pair of recesses and a second pair of recesses, aligned, between the modified compact flange and the connecting component, respectively, so that at least one pair of keys is inserted into at least one pair of corresponding keyways of the first and second pairs of keyways, between the coupling of the modified compact flange to the connecting component, the at least one pair of keys being of any shape, with or without gaps.

7. The flange connection set according to claim 1, wherein the modified compact flange comprises a first tubular keyway surrounding a first hole in the tab in which fasteners will be inserted, and the connecting component comprises a second tubular keyway surrounding a second hole in the connecting component in which the fasteners will be inserted.

8. The flange connection set according to claim 7, further comprising a keyway inserted into at least one aligned first and second tubular keyway between the coupling of the modified compact flange to the connecting component.

9. The flange connection set according to claim 1, wherein the modified compact flange comprises at least one keyway in an external radius of the first contact face of the tab and at least one keyway in an external radius of the first contact face of the connecting component.

10. The flange connection set according to claim 9, further comprising at least one keyway inserted into the at least one keyway in the external radius of both the modified compact flange and the connecting component, the key being of any shape, with or without gaps.

11. The flange connection set according to claim 1, wherein the connecting component can be another modified compact flange, a block, a valve body or other mechanical component to which the modified compact flange is coupled.

12. The flange connection set according to claim 1, wherein the protrusion fixes the sealing ring to the modified compact flange, allowing the coupling of the modified compact flange to the connecting component in any position.

13. A method comprising: performing a seal test of a flange connection set, according to claim 2, by pressurizing the seal test chamber, formed by the two sealing regions and the seal, by injecting a hydraulic fluid or gas through the channel.

* * * * *